United States Patent
Li et al.

(10) Patent No.: US 11,536,285 B2
(45) Date of Patent: Dec. 27, 2022

(54) APPARATUS AND METHOD FOR DIAGNOSING AND CONTROLLING AERODYNAMIC STABILITY OF COMPRESSOR

(71) Applicant: INSTITUTE OF ENGINEERING THERMOPHYSICS, CHINESE ACADEMY OF SCIENCES, Beijing (CN)

(72) Inventors: Jichao Li, Beijing (CN); Juan Du, Beijing (CN); Chaoqun Nie, Beijing (CN); Hongwu Zhang, Beijing (CN)

( * ) Notice: Subject to any disclaimer, the term of this patent is extended or adjusted under 35 U.S.C. 154(b) by 256 days.

(21) Appl. No.: 16/480,673

(22) PCT Filed: Nov. 22, 2017

(86) PCT No.: PCT/CN2017/112331
§ 371 (c)(1),
(2) Date: Jul. 24, 2019

(87) PCT Pub. No.: WO2018/137394
PCT Pub. Date: Aug. 2, 2018

(65) Prior Publication Data
US 2021/0131441 A1 May 6, 2021

(30) Foreign Application Priority Data
Jan. 24, 2017 (CN) .......................... 20170062990.5

(51) Int. Cl.
*F04D 27/00* (2006.01)
*F04D 27/02* (2006.01)
(Continued)

(52) U.S. Cl.
CPC ........... *F04D 27/001* (2013.01); *F04D 27/00* (2013.01); *F04D 27/002* (2013.01);
(Continued)

(58) Field of Classification Search
CPC .............. F04D 27/001; F04D 27/0238; F04D 27/0246; F04D 29/684; F04D 27/00; F04D 27/002; G01M 15/14
(Continued)

(56) References Cited

U.S. PATENT DOCUMENTS 5,594,665 A * 1/1997 Walter ................... F04D 27/001
73/660
2001/0014837 A1* 8/2001 Escuret ............... F04D 27/0207
700/170
(Continued)

FOREIGN PATENT DOCUMENTS

CN 1464179 A 12/2003
CN 102900564 A 1/2013
(Continued)

OTHER PUBLICATIONS

Zhang Lei et al: "Aerodynamic Noise Characteristics During Evolution of Rotating Stall in Centrifugal Fan" China Academic Journal Electronic Publishing House, Proceeding of the CSEE, vol. 33, No. 32, Nov. 15, 2013 (Oct. 2013), DOI: 10.1334/j.0258-8013.pcsee 2013.32.005.
Li Jichao et al: "Experimental Investigation of Stability Enhancement Mechanism with Tip Air Injection in Axial Compressor" Journal of Mechanical Engineering, vol. 50, No. 22, Nov. 2014, DOI: 10.3901/ime.2014.22.171.
(Continued)

*Primary Examiner* — Courtney D Heinle
*Assistant Examiner* — Andrew J Marien
(74) *Attorney, Agent, or Firm* — JAS Law, LLP (57) ABSTRACT

An apparatus for diagnosing and controlling the aerodynamic stability of a compressor and method there of are provided. The apparatus includes a measurement device (100), a signal processing device (200) and a control and execution device (300), wherein the measurement device (100) is configured to measure the pressure or velocity fluctuations of air flows in different positions inside a compressor in real time, and to transmit real-time measure-
(Continued)

ment signals obtained from different positions to the signal processing device (200); the signal processing device (200) is configured to determine, according to the real-time measurement signals, a type and spatial distribution of instability precursor in the compressor, and to output corresponding control strategy signals to the control and execution device (300); and the control and execution device (300) executes, according to the received control strategy signals, corresponding control actions to regulate the stability of the compressor (S3).

13 Claims, 4 Drawing Sheets (51) Int. Cl.
  *G01M 15/14* (2006.01)
  *F04D 29/68* (2006.01)
(52) U.S. Cl.
  CPC ..... *F04D 27/0238* (2013.01); *F04D 27/0246* (2013.01); *G01M 15/14* (2013.01); *F04D 29/684* (2013.01)
(58) Field of Classification Search
  USPC ................. 73/700–756, 861–204.27, 170.02
  See application file for complete search history.

(56) References Cited

U.S. PATENT DOCUMENTS

| | | | | |
|---|---|---|---|---|
| 2006/0101826 | A1* | 5/2006 | Martis | F04D 27/0246 60/794 |
| 2009/0169356 | A1* | 7/2009 | Wadia | F04D 27/001 415/26 |
| 2016/0130974 | A1 | 5/2016 | Elysee et al. | |
| 2016/0265452 | A1* | 9/2016 | Martin | F02D 41/221 |
| 2017/0356303 | A1* | 12/2017 | Hodge | G01M 15/14 |
| 2018/0068498 | A1* | 3/2018 | Hodge | F01D 21/003 |
| 2019/0128718 | A1* | 5/2019 | McConkey | G01F 1/7086 |

FOREIGN PATENT DOCUMENTS

| | | |
|---|---|---|
| CN | 103471809 A | 12/2013 |
| CN | 103884467 A | 6/2014 |
| CN | 106640722 A | 5/2017 |
| EP | 3 018 357 A1 | 11/2016 |

OTHER PUBLICATIONS

Journal/Issue,Graduate School of Chinese of Sciences Master Thesis, Research on DSP Online Control Method of Compressor Flow Instability, May/Jun. 2008, ISSN: 1674-0246.
The State Intellectual Property Office of People's Republic of China, "First Office Action" Application No. 201710062990.5, dated Nov. 28, 2017.
The State Intellectual Property Office of People's Republic of China, "Second Office Action" Application No. 201710062990.5, dated Jul. 5, 2018.
From the International Searching Authority PCT, "Written Opinion of the International Searching Authority" dated Feb. 26, 2018, International application No. PCT/CN2017/112331, Applicant: Institute of Engineering Thermophysics, Chinese Academy of Sciences.
Nie et al.; Espacenet Bibliographic data: Abstract of CN1464179 (A) dated Dec. 31, 2003, Title, "Process and Apparatus for Expending Multi-Stage Axial Flow Gas Compressor Stable Operation Zone", Applicant: China Academy of Sciences Institute, China Academy of Sciences Institute of Engineering Thermal Physcis; Institute of Engineering Thermophysics, Chinese Academy of Sciences.
Tong et al.: Espacenet Bibliographic data: Abstract of CN102900564 (A) dated Jan. 30, 2013, Title, "Blade Top Air Injection Stability Controller for Axial Flow Compression System", Applicant: China Academy of Sciences Institute, China Academy of Sciences Institute of Engineering Thermal Physcis; Institute of Engineering Thermophysics, Chinese Academy of Sciences.
Li et al.: Espacenet Bibliographic data: Abstract of CN103471809 (A) dated Dec. 25, 2013, Title, "Ultrahigh Frequency Response Plasma Flow Measurement Device", Applicant: China Academy of Sciences Institute, China Academy of Sciences Institute of Engineering Thermal Physcis; Institute of Engineering Thermophysics, Chinese Academy of Sciences.
Zhang et al.; Espacenet Bibliographic data: Abstract of CN 103884467 (A) dated Jun. 25, 2014, Title, "Plasma Pressure Probe and System for Measuring Pressure by Utilizing Plasma Pressure Probe", Applicant: China Academy of Sciences Institute, China Academy of Sciences Institute of Engineering Thermal Physcis; Institute of Engineering Thermophysics, Chinese Academy of Sciences.
Li et al.; Espacenet Bibliographic data: Abstract of CN106640722 (A) dated May 10, 2017, Title, "Gas Compressor Aerodynamic Stability Diagnosis and Control Device and Method", Applicant: China Academy of Sciences Institute, China Academy of Sciences Institute of Engineering Thermal Physcis; Institute of Engineering Thermophysics, Chinese Academy of Sciences.

* cited by examiner

APPARATUS AND METHOD FOR DIAGNOSING AND CONTROLLING AERODYNAMIC STABILITY OF COMPRESSOR

CROSS-REFERENCE TO RELATED APPLICATIONS

This application is a Section 371 National Stage Application of International Application No. PCT/CN2017/112331, filed on Nov. 22, 2017 and entitled "Device And Method For Diagnosing And Controlling Aerodynamic Stability Of Compressor", and claims priority to Chinese Application No. 201710062990.5, filed on Jan. 24, 2017 and entitled "Device And Method For Diagnosing And Controlling Aerodynamic Stability Of Compressor", the contents of which are incorporated herein by reference in their entirety. This invention generally relates to a field of compressor, and in particular to an apparatus and method for diagnosing and controlling aerodynamic stability of a compressor.

FIELD OF THE INVENTION

This invention generally relates to a field of compressor, and in particular to an apparatus and method for diagnosing and controlling aerodynamic stability of a compressor.

BACKGROUND OF THE INVENTION

At present, researches on mechanism and regulation means of instability precursor of a compressor at home and abroad are relatively independent from each other, and there are no so many choices for the method of research. There are not an apparatus and a method that can simultaneously realize the research and analysis, the real-time warning and the online regulation of instability precursors. The apparatus and method that integrate diagnosis and control research functions of the aerodynamic instability precursor can be used not only to clarify the scientific problems of complex instability precursors and instability mechanisms in the field of turbomachinery, but also to provide a technical support to development of the stability control of aero-engines. Therefore, an apparatus or method, which is capable of distinguishing the type of the instability precursor of the compressor and capable of capturing, analyzing and on line controlling in real time the pre-stall precursor and the stall precursor, not only can contribute to clarify scientific issues such as complex instability precursors and instability mechanism in the field of turbomachinery, but also can provide useful ideas for the stability control technology of aero-engines. Moreover, a large amount of experimental data for the actual engine will also be accumulated to improve the stall margin, satisfying the urgent needs in the national economy and national defense construction, and certain difficulties and challenges in science and technology may be encountered.

SUMMARY OF THE INVENTION

An object of the present invention is to provide an apparatus and a method for diagnosing and controlling aerodynamic stability of a compressor so as to realize an identification of a type of instability precursor of the compressor and a capture of a stall precursor and a pre-stall precursor and so as to regulate stability of the compressor in real time by a corresponding control mechanism.

The invention provides an apparatus for diagnosing and controlling aerodynamic stability of a compressor, including a measurement device, a signal processing device and a control and execution device. The measurement device is configured to measure pressure or velocity fluctuation of airflow at different positions inside the compressor in real time, and to transmit real-time measurement signals obtained at different positions to the signal processing device, wherein the real-time measurement signals include pressure or velocity fluctuation signal of the airflow measured in real time. The signal processing device is configured to determine, according to the real-time measurement signal, a type and a spatial distribution of instability precursor of the compressor in operation, and to output a corresponding control strategy signal to the control and execution device. The control and execution device performs a corresponding control action according to the received control strategy signal to regulate the stability of the compressor.

Optionally, the pressure or velocity fluctuation of the airflow at the different positions includes at least one of a pressure or velocity fluctuation at inlet and outlet ducts of rotor and stator blade passages at each stage in the compressor, a pressure fluctuation detected in the casing wall over the blade tip of rotor blade, a pressure fluctuation detected at a blade surface of the stator blade and a pressure fluctuation inside the rotor blade passages.

Optionally, the measurement device includes a contact measurement device. The contact measurement device includes a dynamic pressure sensor and a dynamic probe. The dynamic pressure sensor is arranged on the casing wall of the compressor corresponding to the rotor blades, to measure the pressure fluctuation of the airflow at a blade tip of the rotor blade in real time. The dynamic probe is arranged inside the inlet and outlet ducts to measure the pressure or velocity fluctuation of the airflow in the inlet and outlet ducts of the rotor and stator blade passages in real time. The measurement device further includes a non-contact measurement device. The non-contact measurement device includes an optical measuring instrument. The casing is a transparent casing, the airflow in the compressor is added with reflective particles, and the optical measuring instrument is disposed outside the casing to emit a laser light and receive light signal reflected by the reflective particles in the airflow in the compressor, thus measuring in real time pressure or velocity fluctuation of the airflow inside the rotor and stator blades passages.

Optionally, the signal processing device includes a central processor. The central processor is configured to extract a characteristic parameter of a pressure or velocity fluctuation in the real-time measurement signal, and to compare the characteristic parameter with a threshold value to determine a stable state of the compressor in real time. The characteristic parameter includes at least one of a frequency spectral characteristic, a correlation characteristic or a propagation characteristic, and the threshold value is a preset critical value of the pressure or velocity fluctuation of the airflow in the compressor at which the airflow is changed from a stable state to an unstable state.

Optionally, the control and execution device includes a driving module and an actuation module. The driving module receives a control strategy signal transmitted by the signal processing device, and outputs a corresponding execution signal to the actuation module according to the control strategy signal. The actuation module regulates the stability of the compressor according to the execution signal. The actuation module includes at least one of an inlet adjustable guide blade, a self-recirculating injection device, a micro injection device, and a casing treatment device.

The present invention further provides a method for diagnosing and controlling stability of a compressor using the above-described apparatus for diagnosing and controlling aerodynamic stability of a compressor, including the following steps:

S1. measuring pressure or velocity fluctuation of the airflow at different positions inside the compressor in real time with the measurement device, and transmitting real-time measurement signals obtained at different positions to the signal processing device;

S2. determining, according to the real-time measurement signals, a type and a spatial distribution of instability precursor of operation of the compressor with the signal processing device, and outputting a control strategy signal to the control and execution device;

S3. performing a corresponding control action according to the received control strategy signal with the control and execution device to regulate the stability of the compressor.

Optionally, the step S2 includes:

S21. extracting a characteristic parameter of a pressure or velocity fluctuation of the airflow in the real-time measurement signal with the signal processing device, wherein the characteristic parameter includes at least one of a frequency spectral characteristic, a correlation characteristic, or a propagation characteristic;

S22. determining with the signal processing device whether the characteristic parameter reaches or exceeds a threshold value that is a preset critical value of the pressure or velocity fluctuation of the airflow in the compressor at which the airflow is changed from a stable state to an unstable state;

S23. outputting a control strategy signal to the control and execution device with the signal processing device when the characteristic parameter reaches or exceeds the threshold value.

The apparatus and the method for diagnosing and controlling aerodynamic stability of a compressor according to the invention have the following advantages:

1. The apparatus and the method of the present invention integrate a multi-channel high speed data acquisition module, a dynamic signal data analysis module and a driving module, and thus pressure and velocity fluctuation data acquisition, mass data storage, and rapid analysis of dynamic signals can be simultaneously performed.

2. The apparatus and the method of the present invention can monitor the dynamic pressure and velocity fluctuation in the compressor in real time, and an instability way of the compressor can be quickly determined.

3. The apparatus and the method of the present invention can capture a signal of the stall precursor and the pre-stall precursor of the compressor in real time, realizing a monitoring to the stability of the compressor.

4. The apparatus and the method of the present invention can achieve flexible regulation to stability of the compressor by making full use of signal of the pre-stall precursor of the compressor captured in real time in connection with various control means such as a jet at the blade tip, a self-circulating suction-jet and the adjustable guide blade.

DETAILED DESCRIPTION

To make objects, technical solutions and advantages of the present invention more clear and understandable, the present invention will be further described in detail below with reference to the specific embodiments and the drawings.

An object of the present invention is to provide an apparatus and a method for diagnosing and controlling aerodynamic stability of a compressor, and the research and analysis, real-time warning and online regulation on the instability precursor of the compressor are simultaneously realized. When the compressor is running stably, its average airflow fluctuation, including the pressure and velocity fluctuations of the airflow, is maintained within a certain range. As different from the average airflow fluctuation, the pressure or velocity fluctuation of the airflow that may affect the stable operation of the compressor is called disturbance. When the disturbance occurs, if it is not suppressed or eliminated, the continuous development of the disturbance will cause the compressor to be unstable. Compressor instability refers to a process in which the compressor enters into an unstable operating state. The pressure or velocity fluctuation of the airflow in the compressor will exhibit certain precursor characteristics from generation of the disturbance to eventual instability of the compressor. Such characteristics are called instability precursors herein. These instability precursors may be divided into a pre-stall precursor and a stall precursor. The stall precursor refers to the pressure or velocity fluctuation characteristics before instability. The pre-stall precursor refers to smaller and finer disturbance components before the stall precursor occurs. In other words, the process in which the compressor enters into the instability state starts from a stable operating state, to a pre-stall precursor, then to a stall precursor, and finally develops into an instability state.

The apparatus and method of the present invention may be used to diagnose and control aerodynamic stability of the compressor in real time. The apparatus and method of the present invention are able to measure the pressure and/or velocity fluctuation of the airflow at different positions in the compressor in real time, determine the operating state of the compressor in real time and perform an online regulation. The pressure and/or velocity fluctuation of the airflow at different positions in the compressor herein mainly include (s) the pressure or velocity fluctuation in inlet and outlet ducts of the rotor and stator blade passages at each stage in the compressor, pressure fluctuation between a blade tip of the rotor blades and a wall surface of a casing, pressure fluctuation at blade surfaces of the stator blades and pressure fluctuation inside the rotor blade passages. By analyzing the real-time measurement signals such as the pressure and/or velocity fluctuation of the airflow obtained at the different positions described above, the apparatus and the method of the present invention determine whether the characteristics of the pressure and/or velocity fluctuation of the airflow in the real-time measurement signal meet or even exceed the instability precursor such as a pre-stall precursor and/or a stall precursor. In the initial period of the occurrence of the corresponding instability precursor, a corresponding targeted regulation measure is taken according to the type and the spatial distribution characteristics of the instability precursor, timely eliminating the impact of disturbance and inhibiting a further development of the instability precursor. The spatial position in the compressor where the disturbance may occur generally includes the circumferential positions of the passages, the radial positions of the passages, and the axial positions thereof. The circumferential position of the passage refers to a circumferential position between the blade tip of rotor blades and the casing at each stage; and the radial position of the passage refers to a radial position from the hub to the casing, mainly including the radial position where inlet and outlet ducts of rotor and/or stator blade passages are located. The axial position refers to an axial position inside the rotor and stator blade passages at each stage. By arranging a certain number of measurement devices at these positions, it is possible to monitor the airflow fluctuations at these positions in the compressor in real time, and to capture the occurrence of the disturbance in time. When the disturbance in the compressor is detected, the influence of the disturbance on the operation of the compressor is predicted by the signal processing device. If the degree of development of the disturbance has reached or has caused the pre-stall precursor or the stall precursor, it is necessary to take necessary control strategy for the compressor and carry out targeted regulation.

Figure 1:
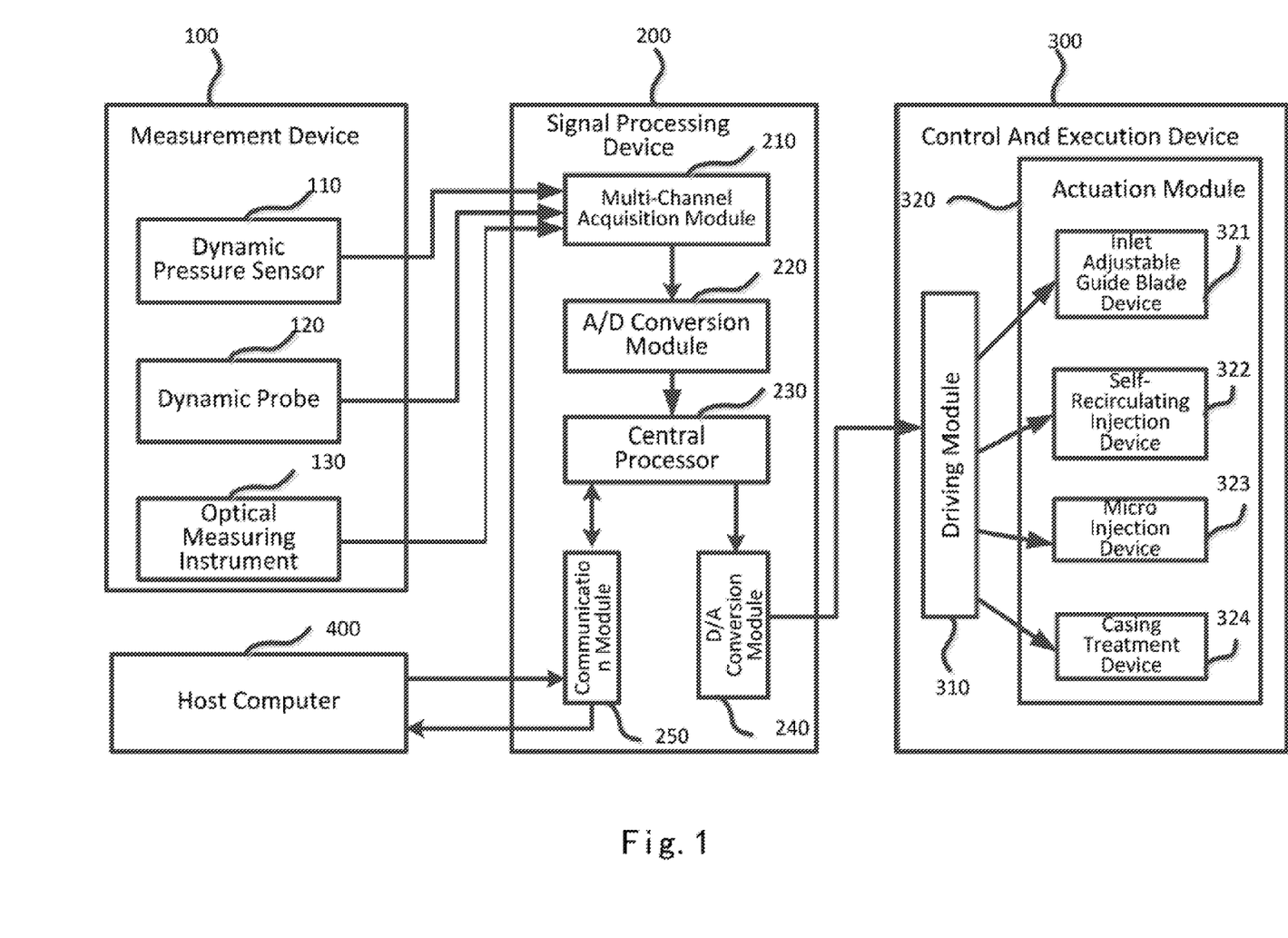
FIG. 1 is a structural view of an apparatus for diagnosing and controlling aerodynamic stability of a compressor according to an embodiment of the present invention.

FIG. 1 is a block diagram showing the structure of an apparatus for diagnosing and controlling aerodynamic stability of a compressor according to an embodiment of the present invention. As shown in FIG. 1, the apparatus of the embodiment includes a measurement device 100, a signal processing device 200, a control and execution device 300, and a host computer 400.

The measurement device 100 is configured to measure the pressure or velocity fluctuation of the airflow at different positions inside the compressor in real time, so that the instability way of the compressor can be quickly identified during the instability process of the compressor and then the obtained real-time measurement signal is transmitted to the signal processing device 200. The real-time measurement signal includes a pressure or velocity fluctuation signal of the airflow measured in real time. If the starting position of the instability, that is, the initial position where the disturbance occurs, is not effectively identified, it is difficult to take a reliable control measure to suppress the instability. The spatiotemporal distribution of the disturbance is detected in real time, thereby achieving the purpose of quickly determining the instability way of the compressor.

The signal processing device 200 is configured to determine, according to the real-time measurement signal, a type and a spatial distribution of instability precursor of the compressor in operation, and to output a control strategy signal to the control and execution device 300. The signal processing device 200 selects an appropriate detection analysis method for the stall precursor and/or the pre-stall precursor according to the obtained instability way, and outputs a control strategy signal to the control and execution device 300 after the analysis.

The control and execution device 300 performs a corresponding control action according to the received control strategy signal to regulate the stability on the compressor.

The host computer 400 is pre-installed with a data monitoring software to display the signal acquisition process, the control process and the results.

The measurement device 100 in one embodiment includes both a contact measurement device and a non-contact measurement device, wherein the contact measurement device includes a dynamic pressure sensor 110 and a dynamic probe 120. The non-contact measurement device includes an optical measuring instrument 130.

Figure 2:
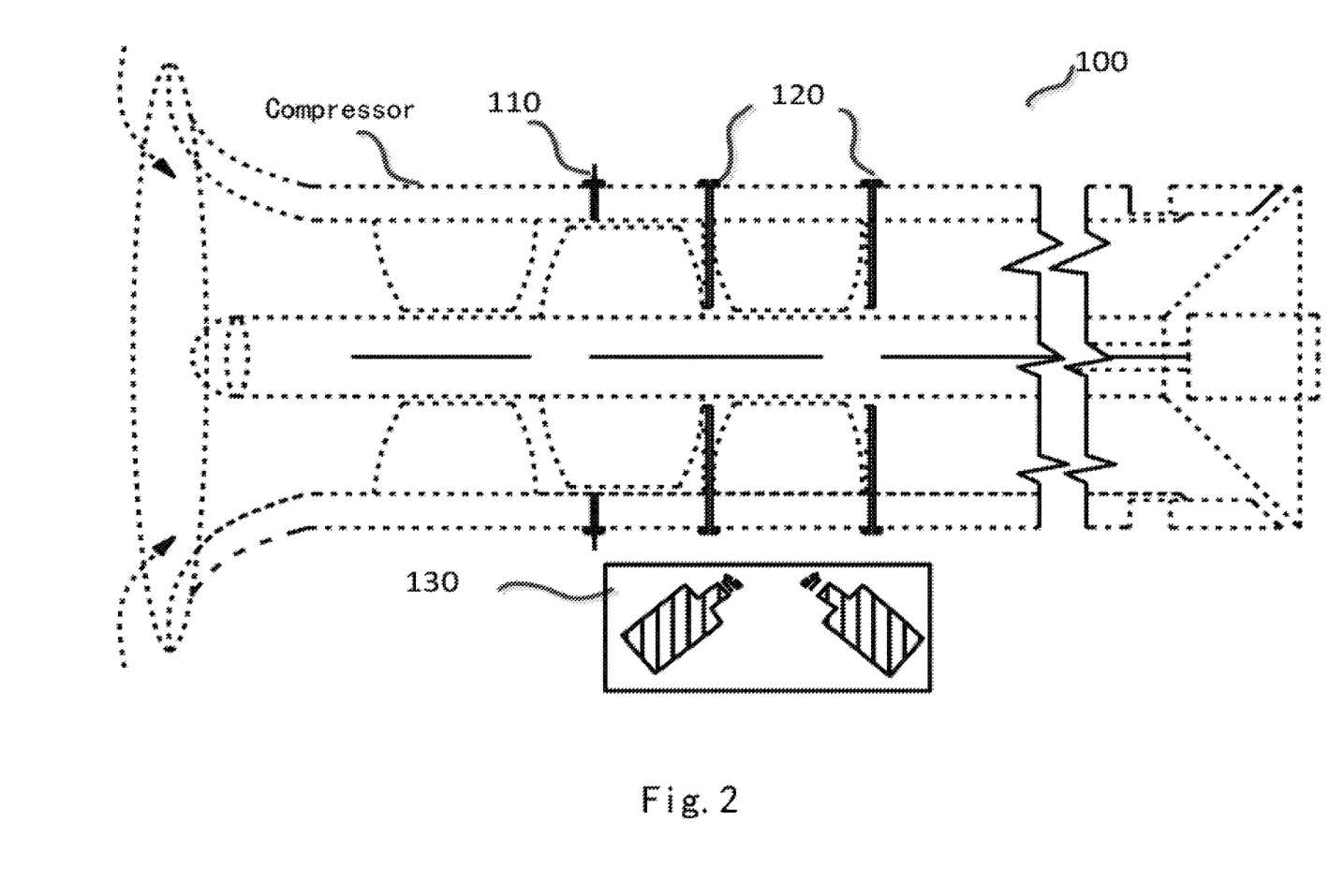
FIG. 2 is a schematic view showing an arrangement of a measurement device in a compressor according to an embodiment of the present invention.

The arrangement of the measurement device 100 at different positions in the compressor in one embodiment is illustrated in FIG. 2.

A plurality of dynamic pressure sensors 110 are disposed inside the wall of the casing of the rotor blades of the compressor to monitor the pressure fluctuation at the blade tip of the rotor blades of the compressor in real time.

A plurality of dynamic probes 120 are disposed inside the inlet and outlet ducts, in particular at inlets and outlets thereof, to detect the pressure fluctuation at inlet and outlet ducts of rotor blade passages and the pressure fluctuation at the inlet and outlet ducts of the stator blade passages in real time.

The optical measuring instrument 130 is disposed outside the compressor, and the pressure fluctuation inside the rotor and stator blade passages is measured by means of a laser reflection. When the optical measuring instrument 130 is used, the casing in an embodiment is required to be made of transparent material to ensure that the laser can penetrate it. Further, the reflective particles are continuously added in the airflow entering the compressor, so that the reflective particles flow inside the rotor and stator blade passages with the airflow. The optical measuring instrument 130 is disposed outside the casing, and determines the instability precursor of flow in the gas passage by measuring the light of reflected by the reflective particles, detecting the flow inside the rotor and stator blade passages in real time.

In one embodiment, the signal processing device 200 includes a multi-channel acquisition module 210, an A/D conversion module 220, a central processor 230, a D/A conversion module 240, and a communication module 250.

The multi-channel acquisition module 210 is electrically connected to the measurement device 100, receives the real-time measurement signals obtained by the measurement device 100 at different positions of the compressor, and transmits the signals to the A/D conversion module 220.

The A/D conversion module 220 performs A/D conversion, that is, analog signal/digital signal conversion, on the received real-time measurement signals, and then transmits the signals to the central processor 230.

The central processor 230 is configured to extract a characteristic parameter of pressure or velocity fluctuation in the real-time measurement signal, compare the characteristic parameter with a threshold value, and determine stable state of the compressor in real time in operation. The characteristic parameter includes at least one of a spectral characteristic, a correlation characteristic, or a propagation characteristic. The threshold value is a preset critical value of the pressure or velocity fluctuation of the airflow in the compressor at which the airflow is changed from a stable state to an instable state.

Specifically, the central processor 230 includes a disturbance analysis algorithm sub-module and a comparison algorithm sub-module. The disturbance analysis algorithm sub-module integrates frequency spectrum analysis, timing sequence analysis, wavelet analysis, correlation analysis, and probability and statistical analysis algorithms. The disturbance analysis algorithm sub-module performs frequency spectrum analysis, correlation analysis, and propagation characteristic analysis on the disturbance, and the characteristic parameter such as the spectral characteristic, the correlation characteristics and the propagation characteristics of the disturbance is obtained as a basis for stability control. The disturbance analysis algorithm sub-module integrates a variety of analysis algorithms. This will make the detection analysis of the disturbance more comprehensive and make it possible to capture the occurrence of the disturbance in time, leaving enough time for a response of the control and execution device. Because the disturbances are mixed in the average flow fluctuation in the compressor, for a small disturbance, for example, it may be disturbed by the noise of the compressor itself. In this case, it may be difficult for the spectrum analysis to detect it, and the correlation analysis and the wavelet analysis may detect the occurrence of such small disturbances in time. For another example, for a relatively strong disturbance, it may be easily and intuitively reflected through the frequency spectral analysis.

The threshold value of the pressure or velocity fluctuation of the airflow in the compressor at which the airflow is changed from a stable state to an unstable state is preset and stored in the comparison algorithm sub-module, wherein the threshold value is selected according to characteristic parameters of the pressure or velocity fluctuation of the airflow presented by the pre-stall precursor or the stall precursor of the compressor. The characteristic parameters extracted by the disturbance algorithm sub-module are compared with the threshold value so as to determine the stable state of the compressor. The effective signal processed in the data analysis module is transmitted to the driving module of the control and execution device. The signal is then transmitted to the D/A conversion module 240.

The D/A conversion module 240 performs for the received signal a digital/analog conversion processing, and then transmits it to the control and execution device 300.

The communication module 250 performs a bidirectional communication with the host computer 400, and also performs a bidirectional communication with the central processor 230.

In one embodiment, the control and execution device 300 includes a driving module 310 and an actuation module 320. The driving module 310 is connected to the actuation module performing the control measures, so as to receive signals transmitted by the signal processing device and output different execution signals to the actuation module 320 according to different instability ways of the compressor. The actuation module 320 performs a corresponding regulation function according to the received execution signal, for example, a function of actuating a stepping motor for the adjustable guide blade or a proportional solenoid valve for jetting from the blade tip, achieving a flexible online regulation to the stability of the compressor.

The actuation module 320 includes an inlet adjustable guide blade mechanism 321, a self-recirculating injection device 322, a micro injection device 323, and a casing treatment device 324.

The adjustable guide blade device 321 is provided for stall at the hub region or the corner separation. The adjustable guide blade device 321 is capable of actuating the stepping motor of the adjustable guide blade and adjusting a pre-rotation angle of the guide blade, thereby achieving the effects of adjusting the angle of attack of the inlet of the rotor blade and improving the flowing.

The self-recirculating injection device 322 and the micro injection device 323 are provided for stall at the blade tip. They may reduce the load at the blade tip or suppress the tip leakage flow by means of air jet, thereby achieving the purpose of extending the stable working range of the compressor.

The casing treatment device 324 is provided for the blade tip stall. The casing treatment device 324 is able to adjust the size of the back cavity to suppress the growth of the disturbance, thereby achieving the purpose of extending the stable working range of the compressor.

In an embodiment, the host computer 400 is pre-installed with the data monitoring software to display the signal acquisition process, the control process and the results. The host computer 400 is able to transmit data to the central processor 240 through the communication module 250 while performing a data display.

Figure 3:
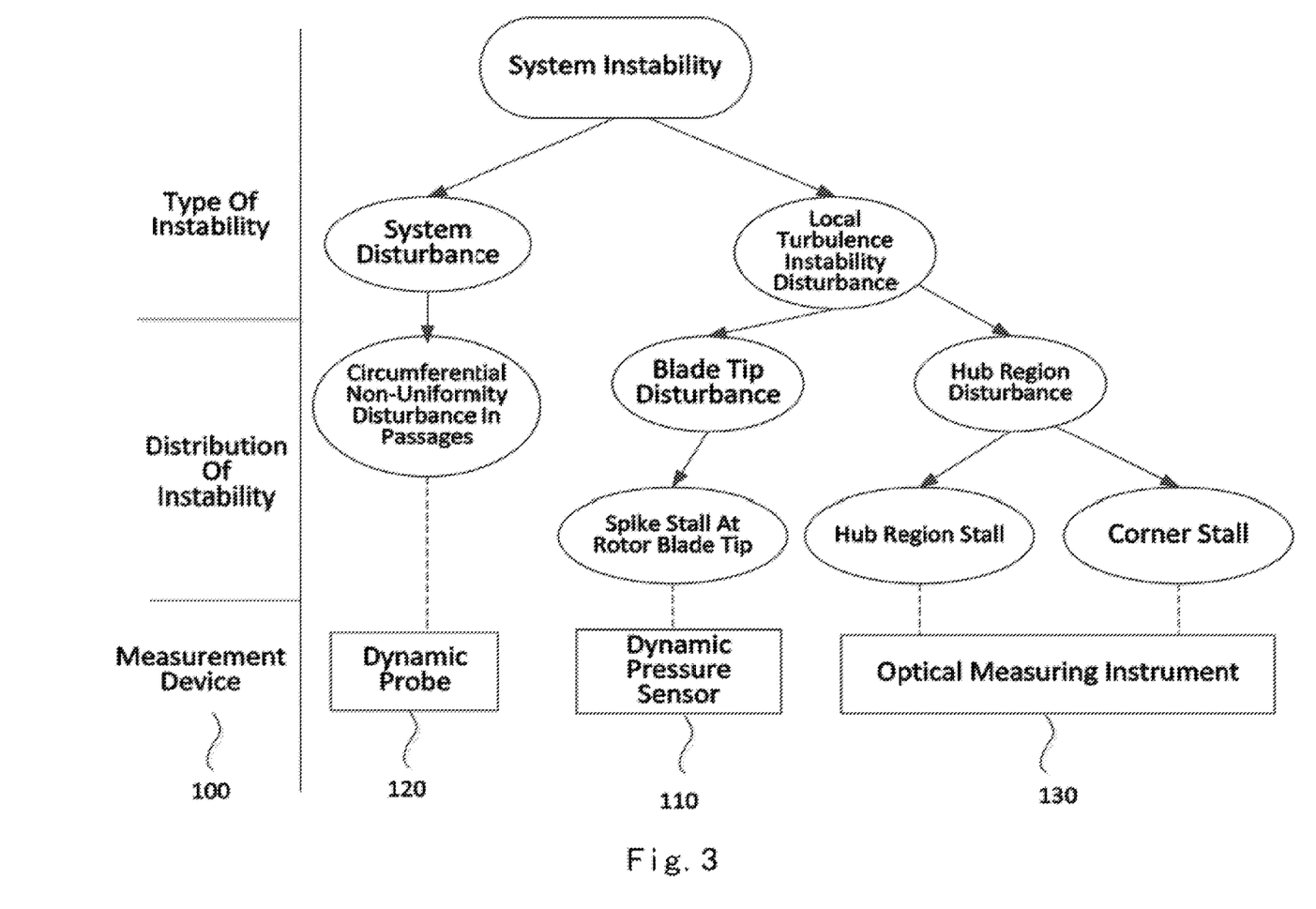
FIG. 3 is a schematic view showing a type of instability of a compressor according to an embodiment of the present invention.

FIG. 3 is a schematic view showing the type of instability of a compressor according to an embodiment of the present invention. The starting position and time where instability disturbance occurs will be different. The disturbances inside the rotor and stator blade passages in the compressor are various. If the starting position of the instability cannot be effectively identified, it is difficult to take a reliable control measure to suppress the stall. Although a numerical calculation can be used to simulate the starting position of the disturbance during the stall of the compressor, it is not possible to simulate conditions in which the compressor is operating under variable working conditions or in which the boundary conditions at the inlet change, such as the variable working condition of operating under partial load or a boundary condition of inlet distortion. As shown in FIG. 3, since the blade load or the inlet boundary conditions may change so that the compressor may exhibit different ways of instability, measurements at different positions may be required. Some compressors may suffer from a circumferential long-distance disturbance. In this case, the disturbance signal can be effectively measured by the dynamic probe 120 disposed in the inlet and outlet ducts in the compressor. Some compressors may suffer from spike stall of the rotor blade tip. In this case, the dynamic pressure sensor 110 disposed on the casing wall over the rotor blade in the compressor can effectively measure the disturbance signal there. Some compressors may suffer from stall at the hub region of the rotor blade, and some compressors may suffer from corner stall of the stator blade. When this stall is suffered, the optical measuring instrument 130 may be used to determine the flowing characteristics of the airflow inside the gas passage by measuring the light reflected by the reflective particles, and detect the disturbance inside the rotor and stator blade passage in real time.

In FIG. 3, the type of instability refers to the way the compressor enters into the unstable operating state, and mainly includes system surge and local rotation stall. The distribution of instability refers to the spatial positional distribution of the instability precursor of the compressor.

System instability generally occurs due to a gradual development of a system disturbance or a local turbulence instability disturbance. The system disturbance refers to the long-distance disturbance occurring in the circumferential direction of the whole row of the rotor blades. The local turbulence instability disturbance refers to the disturbance occurring at a certain local position of the rotor blade or the stator blade. The difference between them is that the system disturbance is a disturbance of a long-distance circumferential propagation and the local turbulence instability turbulence is a disturbance occurring at the blade tip or the hub region, or inside one or several blade passages. At the same time, the local turbulence disturbance may also develop and evolve into a system disturbance.

The system disturbance is generally caused by a circumferential non-uniformity in the inlet and outlet ducts. The circumferential non-uniformity disturbance in the inlet and outlet ducts refers to the circumferential non-uniformity of the flow occurring at the positions of inlet and outlet ducts of rotor and/or stator blade passage at each stage. The dynamic probe 120 is disposed at inlet and outlet ducts of the rotor and/or stator blade passages at each stage, such that it is possible to measure the circumferential non-uniformity in the inlet and outlet ducts of rotor and/or stator blade passages at each stage, including the radial disturbance from the hub to the inner wall of the casing. After arranging a plurality of dynamic probes symmetrically in the circumferential direction, the disturbance propagation characteristics of the whole circumference of the blade row can be captured.

The local turbulence instability disturbance is mainly distributed at the radial positions and axial positions of the passages and includes blade tip disturbance and hub region disturbance. The blade tip disturbance occurs in one or several blade passages at the rotor blade tip, and the hub region disturbance is referred to the disturbance occurring at the hub region of the stator and rotor blades passage.

The blade tip disturbance mainly refers to a spike stall of the rotor blade tip, mostly spiking type of the stall precursor. The dynamic pressure sensor 110 is disposed on the wall surface of the casing of the rotor blades of the compressor so that it is possible to measure the spike stall inception at rotor blade tip. The spike stall inception may be represented as a spike fluctuation of the pressure on the casing wall. The spike fluctuation of the pressure can be captured by the dynamic pressure sensor 110 disposed inside the casing, thereby measuring the spike stall of the rotor blade tip.

The hub region disturbance includes hub region stall of the rotor blades and corner stall of the stator blades. The corner stall is mainly presented as the flow separation in the end zone. It is difficult for the contact measurement sensor to capture the pressure fluctuation at the hub region of the rotor and stator blade passage. At this time, the detection of the separation pressure fluctuation wave at the root needs to be realized by means of the optical measuring instrument 130.

After the occurrence and spatial distribution of the disturbance is measured by the measurement device 100 in real time, the signal processing device 200 preforms an analyses and a determination, and outputs a control strategy signal to the control and execution device 300. Then a control action is performed by the actuation module 320 of the control and execution device 300 to regulate the stability of the compressor.

For example, when it is detected that the circumferential non-uniformity disturbance in the blade passages causes the instability precursor of the system, the inlet adjustable guide blade mechanism 321 of the actuation module 320 can actuate the stepping motor of the adjustable guide blade, and adjust the angle of the guide blade to change the pre-rotation angle of the rotor blade at the inlet, suppressing the circumferential development of the disturbance.

When the spike stall inception at the rotor blade tip is detected, the self-recirculating injection device 322 and the micro injection device 323 of the actuation module 320 can adjust the valve opening through the valve driving module to adjust the amount of the jet, and/or the casing treatment device 324 can actuate the motor to rotate through the motor driving module to change the size of the back cavity.

When the hub region stall is detected, the inlet adjustable guide blade device 321 of the actuation module 320 can drive the motor to rotate, adjust the angle of the guide blade to change the pre-rotation angle of the rotor blade at the inlet, suppressing the development of the hub region stall.

When the corner stall is detected, the inlet adjustable guide blade device 321 of the actuation module 320 can drive the actuation motor to rotate and adjust the angle of the guide blade to change the pre-rotation angle of the rotor blade at the inlet, suppressing the development of the hub region separation.

Figure 4:
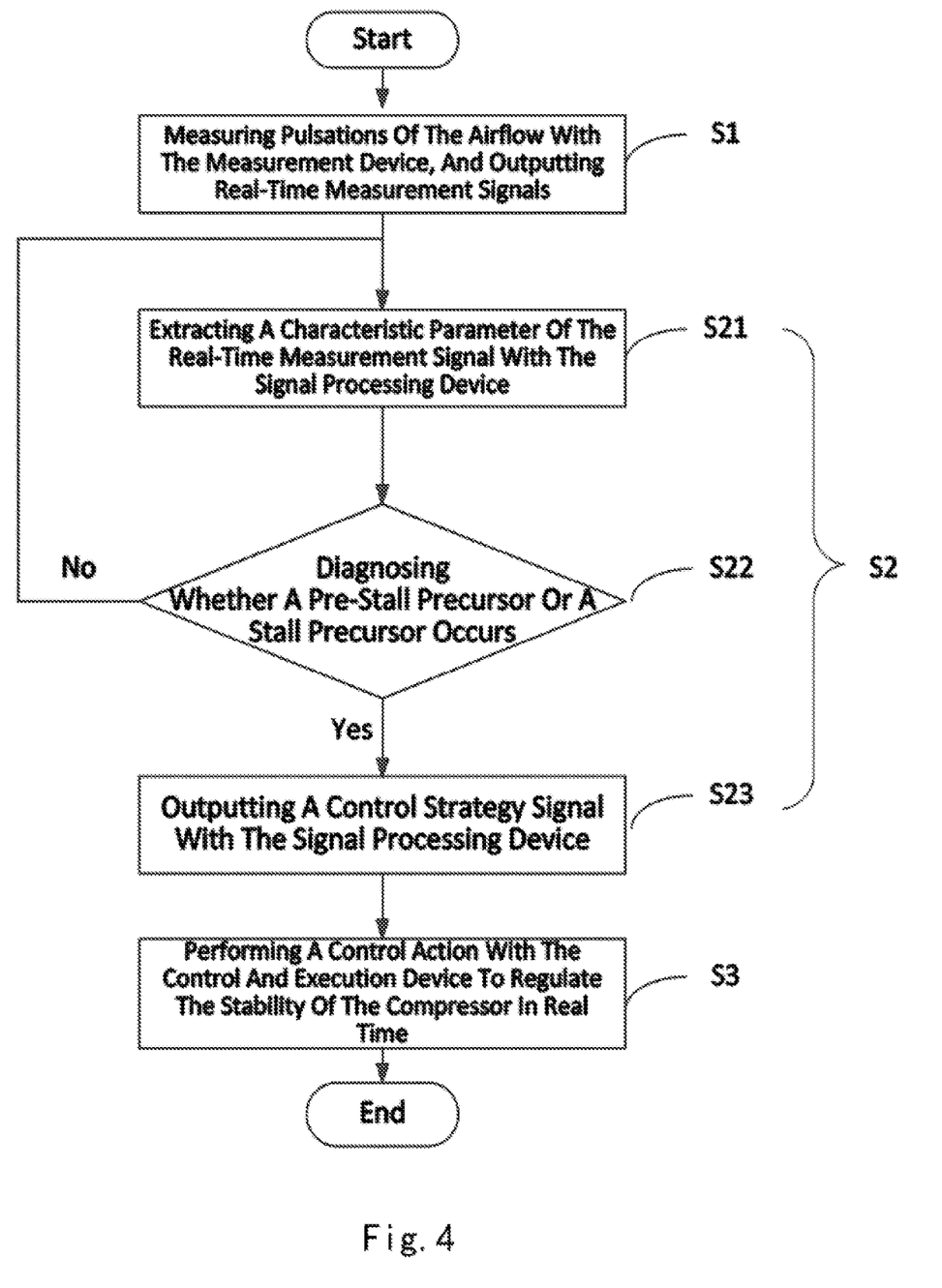
FIG. 4 is a flow chart of a method for diagnosing and controlling aerodynamic stability of a compressor according to an embodiment of the present invention.

FIG. 4 is a flow chart of a method for diagnosing and controlling aerodynamic stability of a compressor according to an embodiment of the present invention. The method includes the following steps:

S1. measuring pressure and velocity fluctuations of the airflow at different positions inside the compressor in real time with the measurement device, and transmitting real-time measurement signals obtained at different positions to the signal processing device;

S2. determining, according to the real-time measurement signals, a type and a spatial distribution of instability precursor of the compressor in operation with the signal processing device, and outputting a control strategy signal to the control and execution device, wherein the step S2 specifically includes:

S21. analyzing the real-time measurement signal with the signal processing device 200, that is, extracting a characteristic parameter of the pressure or velocity fluctuation of the airflow in the real-time measurement signal through the disturbance analysis algorithm sub-module, wherein the characteristic parameter includes a frequency spectral characteristic, a correlation characteristic, or a propagation characteristic;

S22. diagnosing whether a pre-stall precursor or a stall precursor occurs with the signal processing device 200, that is, determining with the comparison algorithm module whether the extracted characteristic parameter analysis disturbance reaches or exceeds a threshold value; outputting no signal if the threshold value has not been reached, and going into S23 if the threshold value is reached or exceeded, which indicates that an instability precursor occurs;

S23. confirming the type of the precursor and the instability way with the signal processing device 200, and outputting the control strategy signal to the control and execution device;

S3. performing a corresponding control action according to the received control strategy signal with the control and execution device to regulate the stability of the compressor.

Specifically, for the hub region stall or the corner separation, the adjustable guide blade mechanism 321 in the control and execution device actuates the stepping motor of the adjustable guide blade and adjusts the pre-rotation angle of the guide blade, thereby achieving the effects of adjusting the angle of attack of the inlet of the rotor blade and improving the flowing. For the blade tip stall, the self-recirculating injection device 322 and the micro injection device 323 in the control and execution device may reduce the load at the blade tip or suppress the leakage flow at the blade tip by means of air jet, thereby achieving the purpose of extending the stable working range of the compressor. For the blade tip stall, the casing treatment device 324 in the control and execution device is able to adjust the size of the back cavity to suppress the growth of the disturbance, thereby achieving the purpose of extending the stable working range of the compressor.

The objects, technical solutions and beneficial effects of the present invention have been further explained above in detail in connection with the embodiments of the present invention. It should be appreciated that the above description is only related to the specific embodiments of the present invention, and is not intended to limit the present invention. Any modifications, equivalent substitutions, improvements and the like that are made within the spirit and principles of the present invention should be considered to fall into the scope of protection of the present invention.

What is claimed is:

1. An apparatus for diagnosing and controlling aerodynamic stability of a compressor having a casing, comprising:
a sensor, a signal processor; and a controller,
wherein the sensor comprises a contact sensor and a non-contact sensor, and is configured to measure pressure or velocity fluctuation of airflow at different positions inside the compressor in real time, and to transmit real-time measurement signals obtained at the different positions to the signal processor, the real-time measurement signals comprising a pressure or velocity fluctuation signal of the airflow measured in real time,
wherein the signal processor is configured to determine, according to the real-time measurement signals, a type and a spatial distribution of instability precursor of the compressor in operation, and to output a corresponding control strategy signal to the controller, and
wherein the controller performs a corresponding control action according to the received control strategy signal to regulate the stability of the compressor, and
wherein the pressure or velocity fluctuation of the airflow at the different positions comprises:
a first pressure fluctuation or a first velocity fluctuation at an inlet duct of a rotor blade passage between rotor blades and at an outlet duct of a stator blade passage between stator blades in the compressor;
a second pressure fluctuation or a second velocity fluctuation at an outlet duct of the rotor blade passage and at an inlet duct of the stator blade passage;
a third pressure fluctuation between a rotor blade tip and a casing wall of the casing;
a fourth pressure fluctuation at a blade surface of a stator blade;
a fifth pressure fluctuation or a fifth velocity fluctuation inside the rotor blade passage; and
a sixth pressure fluctuation or a sixth velocity fluctuation inside the stator blade passage,
wherein the contact sensor comprises a dynamic pressure sensor and a dynamic probe,
the dynamic pressure sensor is arranged on the casing wall in the compressor corresponding to a blade tip of a rotor blade, to measure a pressure fluctuation of the airflow at the rotor blade tip in the compressor in real time, and
the dynamic probe is arranged inside inlet and outlet ducts to measure the pressure or velocity fluctuation of the airflow in the inlet and outlet ducts of the rotor and stator blade passages in real time, and
wherein the non-contact sensor is located outside the compressor and spaced a distance from the compressor, and the non-contact sensor comprises an optical measuring instrument,
wherein the casing is a transparent casing, and the airflow in the compressor is added with reflective particles, and
the optical measuring instrument is configured to emit a laser light and receive a light signal reflected by the reflective particles in the airflow in the compressor, so as to measure in real time pressure or velocity fluctuations of the airflow inside the rotor and stator blade passages.

2. The apparatus for diagnosing and controlling aerodynamic stability of a compressor according to claim 1, wherein the signal processor comprises a central processor,
wherein the central processor is configured to extract a characteristic parameter of a pressure or velocity fluctuation in the real-time measurement signals, and to compare the characteristic parameter with a threshold value to determine a stable state of the compressor in real time; and
wherein the characteristic parameter comprises at least one of a frequency spectral characteristic, a correlation characteristic or a propagation characteristic, and the threshold value is a preset critical value of the pressure or velocity fluctuation of the airflow in the compressor at which the airflow is changed from a stable state to an unstable state.

3. The apparatus for diagnosing and controlling aerodynamic stability of a compressor according to claim 1, wherein the controller comprises a driving module and an actuation module,
wherein the driving module receives the control strategy signal transmitted by the signal processor, and outputs a corresponding execution signal to the actuation module according to the control strategy signal, and
wherein the actuation module regulates the stability of the compressor according to the execution signal.

4. The apparatus for diagnosing and controlling aerodynamic stability of a compressor according to claim 3, wherein the actuation module comprises at least one of an inlet adjustable guide blade, a self-recirculating injection device, a micro injection device, and a casing treatment device.

5. A method for diagnosing and controlling stability of a compressor having a casing, comprising:
measuring one or more fluctuation signals of an airflow at one or more positions inside the compressor in real time with a sensor of an apparatus, and transmitting one or more real-time measurement signals obtained at the one or more different positions to a signal processor, wherein the apparatus comprises the sensor, the signal processor and a controller;
determining, according to the one or more real-time measurement signals, a type and a spatial distribution of an instability precursor of the compressor in operation with the signal processor, and outputting one or more control strategy signals to the controller;
performing one or more corresponding control actions according to one or more received outputs of the one or more control strategy signals with the controller to regulate the stability of the compressor,
wherein the measuring one or more fluctuation signals of an airflow at one or more positions comprises measuring the pressure or velocity fluctuation of the airflow at the different positions, and the pressure or velocity fluctuation of the airflow at the different positions comprises:
a first pressure fluctuation or a first velocity fluctuation at an inlet duct of a rotor blade passage between rotor blades and at an outlet duct of a stator blade passage between stator blades in the compressor;
a second pressure fluctuation or a second velocity fluctuation at an outlet duct of the rotor blade passage and at an inlet duct of the stator blade passage;

a third pressure fluctuation between a rotor blade tip and a casing wall of the casing;

a fourth pressure fluctuation at a blade surface of a stator blade;

a fifth pressure fluctuation or a fifth velocity fluctuation inside the rotor blade passage; and a sixth pressure fluctuation or a sixth velocity fluctuation inside the stator blade passage, wherein the sensor comprises a contact sensor and a non-contact sensor, and wherein the contact sensor comprises a dynamic pressure sensor and a dynamic probe, the dynamic pressure sensor is arranged on the casing wall in the compressor corresponding to a blade tip of a rotor blade, to measure a pressure fluctuation of the airflow at the rotor blade tip in the compressor in real time, and the dynamic probe is arranged inside inlet and outlet ducts to measure the pressure or velocity fluctuation of the airflow in the inlet and outlet ducts of the rotor and stator blade passages in real time, and wherein the non-contact sensor is located outside the compressor and spaced a distance from the compressor, and the non-contact sensor comprises an optical measuring instrument, the casing is a transparent casing, and the airflow in the compressor is added with reflective particles, and wherein the optical measuring instrument is configured to emit a laser light and receive a light signal reflected by the reflective particles in the airflow in the compressor, so as to measure in real time pressure or velocity fluctuations of the airflow inside the rotor and stator blade passages.

6. The method of claim 5, wherein the one or more fluctuation signals comprises one or more pressure fluctuation signals of the airflow.

7. The method of claim 5, wherein the one or more fluctuation signals comprises one or more velocity fluctuation signals of the airflow.

8. The method of claim 5, wherein the determining the type and the spatial distribution of the instability precursor of the compressor further comprises:

extracting a characteristic parameter of a pressure fluctuation of the airflow from the one or more real-time measurement signals within the signal processor, wherein the characteristic parameter comprises at least one of a frequency spectral characteristic, a correlation characteristic, or a propagation characteristic;

determining by the signal processor whether the characteristic parameter reaches or exceeds a threshold value that is a preset critical value of the pressure or velocity fluctuation of the airflow in the compressor at which the airflow is changed from a stable state to an unstable state; and outputting the one or more control strategy signals from the signal processor to the controller when the characteristic parameter reaches or exceeds the threshold value.

9. The method of claim 5, wherein the determining the type and the spatial distribution of the instability precursor of the compressor further comprises:

extracting a characteristic parameter of a velocity fluctuation of the airflow from the one or more real-time measurement signals within the signal processor, wherein the characteristic parameter comprises at least one of a frequency spectral characteristic, a correlation characteristic, or a propagation characteristic;

determining by the signal processor whether the characteristic parameter reaches or exceeds a threshold value that is a preset critical value of the pressure or velocity fluctuation of the airflow in the compressor at which the airflow is changed from a stable state to an unstable state; and outputting the one or more control strategy signals from the signal processor to the controller when the characteristic parameter reaches or exceeds the threshold value.

10. The method of claim 5, wherein the sensor is configured to measure the one or more fluctuation signals of the airflow at different positions inside the compressor in real time, and to transmit the one or more real-time measurement signals obtained at the different positions to the signal processor, the one or more real-time measurement signals includes the one or more fluctuation signals of the airflow measured in real time, wherein the signal processor is configured to determine, according to the one or more real-time measurement signals, a type and a spatial distribution of instability precursor of the compressor in operation, and to output a corresponding control strategy signal to the controller, and wherein the controller performs a corresponding control action according to the one or more received control strategy signals to regulate the stability of the compressor.

11. The method of claim 5, wherein the signal processor comprises a central processor, wherein the central processor is configured to extract a characteristic parameter of a pressure or velocity fluctuation in the real-time measurement signals, and to compare the characteristic parameter with a threshold value to determine a stable state of the compressor in real time; and wherein the characteristic parameter comprises at least one of a frequency spectral characteristic, a correlation characteristic or a propagation characteristic, and the threshold value is a preset critical value of the pressure or velocity fluctuation of the airflow in the compressor at which the airflow is changed from a stable state to an unstable state.

12. The method of claim 5, wherein the controller comprises a driving module and an actuation module, wherein the driving module receives the control strategy signal transmitted by the signal processor, and outputs a corresponding execution signal to the actuation module according to the control strategy signal, and wherein the actuation module regulates the stability of the compressor according to the execution signal.

13. The method of claim 12, wherein the actuation module comprises at least one of an inlet adjustable guide blade, a self-recirculating injection device, a micro injection device, and a casing treatment device.

* * * * *